United States Patent
Levesque et al.

(10) Patent No.: US 9,921,609 B2
(45) Date of Patent: Mar. 20, 2018

(54) SYSTEMS AND METHODS FOR DEFORMATION AND HAPTIC EFFECTS

(71) Applicant: Immersion Corporation, San Jose, CA (US)

(72) Inventors: Vincent Levesque, Montreal (CA); Abdelwahab Hamam, Montreal (CA); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/226,322

(22) Filed: Aug. 2, 2016

(65) Prior Publication Data

US 2018/0039302 A1    Feb. 8, 2018

(51) Int. Cl.
| | | |
|---|---|---|
| *G06F 1/16* | (2006.01) | |
| *G06F 3/01* | (2006.01) | |
| *H04B 1/3827* | (2015.01) | |
| *G06F 3/041* | (2006.01) | |

(52) U.S. Cl.
CPC ............ *G06F 1/1652* (2013.01); *G06F 3/016* (2013.01); *H04B 1/3833* (2013.01); *G06F 3/041* (2013.01); *G06F 2200/1637* (2013.01); *G06F 2203/04102* (2013.01)

(58) Field of Classification Search
CPC ................................ G06F 1/1652; G06F 3/016
See application file for complete search history.

(56) References Cited

U.S. PATENT DOCUMENTS

| 6,148,280 | A | 11/2000 | Kramer |
|---|---|---|---|
| 8,004,391 | B2 | 8/2011 | Cruz Hernandez |
| 8,345,013 | B2 | 1/2013 | Heubel et al. |
| 8,531,485 | B2 | 9/2013 | Birnbaum |
| 8,749,115 | B2* | 6/2014 | Pas ...................... A61B 5/1036 310/314 |
| 9,535,550 | B2 | 1/2017 | Levesque |
| 2012/0133494 | A1 | 5/2012 | Cruz-Hernandez et al. |
| 2014/0004906 | A1 | 1/2014 | Chi et al. |
| 2014/0320393 | A1* | 10/2014 | Modarres ................ G06F 3/017 345/156 |
| 2014/0320431 | A1* | 10/2014 | Cruz-Hernandez ..... G06F 3/041 345/173 |
| 2014/0320436 | A1 | 10/2014 | Modarres et al. |
| 2015/0077324 | A1 | 3/2015 | Birnbaum et al. |
| 2015/0277854 | A1 | 10/2015 | Zhang |
| 2016/0147333 | A1 | 5/2016 | Grant et al. |

(Continued)

OTHER PUBLICATIONS

European Patent Office Application No. 17184440.0, Extended European Search Report dated Oct. 19, 2017, 8 pages.

(Continued)

*Primary Examiner* — Tuan H Nguyen

(74) *Attorney, Agent, or Firm* — Kilpatrick Townsend & Stockton LLP

(57) ABSTRACT

Systems and methods for deformation and haptic effects are disclosed. For example, one method includes the steps of receiving a sensor signal from a sensor, the sensor signal indicating a contact with a device and a location of the contact on the device; determining a deformation effect based on the contact and the location of the contact, the deformation effect configured to cause a change in a shape of the device; and outputting the deformation effect to a deformation device configured to change the shape of the device.

18 Claims, 8 Drawing Sheets

(56) References Cited

U.S. PATENT DOCUMENTS

2016/0189492 A1 6/2016 Hamam et al.
2017/0124818 A1 5/2017 Ullrich

OTHER PUBLICATIONS

Roudaut et al., "Designing and Developing SelfActuated Flexible Touch Screens", URL:http://www.anneroudaut.fr/papers/roudautjnobilehci12.pdf, Sep. 21, 2012, 6 pages.

* cited by examiner

… (1) …

SYSTEMS AND METHODS FOR DEFORMATION AND HAPTIC EFFECTS

FIELD

The present application relates to deformable haptic devices and more specifically relates to deformation and haptic effects.

BACKGROUND

Portable computing devices are widely used in a variety of settings and for a variety of reasons. For example, handheld smartphones are commonly used for a variety of communication and entertaining applications, and are commonly equipped with actuators capable of outputting haptic effects. For example, when a smartphone receives a phone call, it can audibly "ring" to alert the user to the incoming call, but can also output a vibration that may also notify the user of the incoming call.

SUMMARY

Various examples are described for systems and methods for deformation and haptic effects.

For example, one disclosed method includes the steps of receiving a sensor signal from a sensor, the sensor signal indicating a contact with a device and a location of the contact on the device; determining a deformation effect based on the contact and the location of the contact, the deformation effect configured to cause a change in a shape of the device; and outputting the deformation effect to a deformation device configured to change the shape of the device.

In another example, a disclosed device includes a sensor; a deformable housing; a deformation device in communication with the deformable housing and configured to change the shape of at least a portion of the deformable housing; a non-transitory computer-readable medium comprising processor-executable program code; and a processor in communication with the sensor, the deformation device, and the non-transitory computer-readable medium, the processor configured to execute the processor executable program code stored in the non-transitory computer-readable medium, the processor-executable program code configured to cause the processor to: receive a sensor signal from the sensor, the sensor signal indicating a contact with the device and a location of the contact on the device; determine a deformation effect based on the contact and the location of the contact, the deformation effect configured to cause a change in a shape of the deformable housing of the device; and output the deformation effect to the deformation device.

In a further example, a non-transitory computer-readable medium comprising processor-executable program code configured to cause a processor to: receive a sensor signal from the sensor, the sensor signal indicating a contact with the device and a location of the contact on the device; determine a deformation effect based on the contact and the location of the contact, the deformation effect configured to cause a change in a shape of the deformable housing of the device; and output the deformation effect to a deformation device configured to change the shape of the housing of the device These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1A:
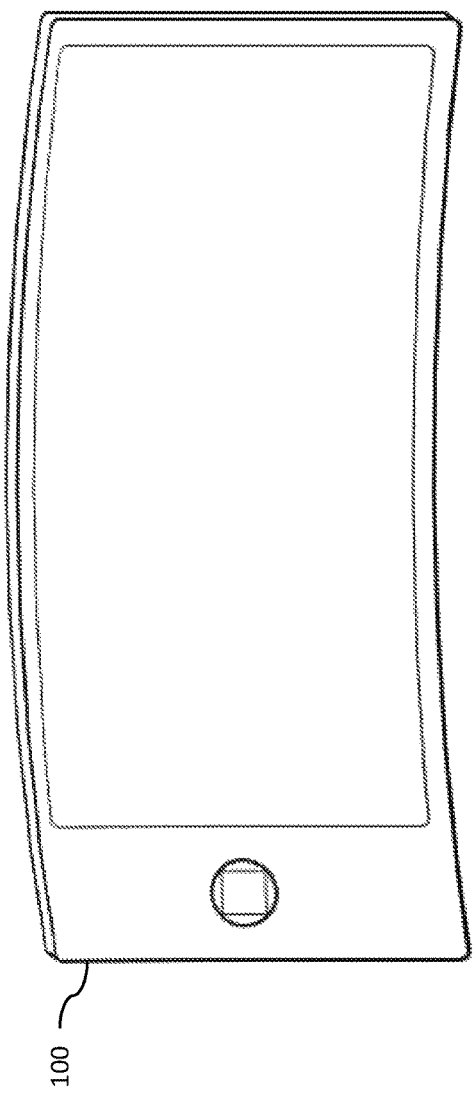
FIGS. 1A-2 show example computing devices for deformation and haptic effects.

Examples are described herein in the context of systems and methods for deformation and haptic effects. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made to achieve the developer's specific goals, such as compliance with application- and business-related constraints, and that these specific goals will vary from one implementation to another and from one developer to another.

Illustrative Example of Deformation and Haptic Effects

In one illustrative example, a smartphone has a deformable housing that allows the user to bend or fold the smartphone into different shapes. In addition, the smartphone includes a deformation device that, in response to receiving a deformation signal, such as from the smartphone's processor, will change its shape, thereby changing the shape of the smartphone's housing.

A user picks up the illustrative example smartphone and puts it into his pocket. While in the user's pocket, the smartphone detects various points of contact with the user and the user's pocket, and determines pressures at the various points of contact. In addition, the smartphone detects from one or more sensors that it is in a substantially vertical orientation, is upside down, and is experiencing periodic forces. The smartphone then determines that it is in the user's pocket and that there are no currently-pending notifications. The smartphone's processor then generates signals to the deformation device to change the shape of the smartphone based on the various points of contact and associated pressures. In this illustrative example, the processor causes the deformation device to change the shape of the smartphone's housing to better conform to the shape of the user's leg. Thus, the deformation device uses the sensor information to detect a shape of the user's leg, such as based on pressures detected at the various points of contact, or pressures applied to portions of the deformation device. After causing the deformation device to change its shape, the processor receives additional sensor signals and further refines the shape of the smartphone based on the additional sensor signals. Thus, the smartphone is able to adaptively change its shape, while idle in this example, to better conform to the shape of the user's leg.

At a later time, while in the user's pocket and conforming to the shape of the user's leg, the smartphone receives a text message. To notify the user of the text message, the processor generates a deformation signal that causes the deformation device to change a shape of the smartphone to anti-conform to the shape of the user's leg. Anti-conformance relates to a shape that does not simply not conform to the shape of an adjacent object, but to a shape that opposes the shape of the adjacent object, which will be discussed in more detail below. Upon feeling the change in shape of the smartphone, the user removes the smartphone from his pocket, at which time the smartphone returns to its rest shape, and views the notification. The user then returns the smartphone to his pocket, and the smartphone again deforms to conform to the shape of the user's leg.

This illustrative example is given to introduce the reader to the general subject matter discussed herein and the disclosure is not limited to this example. The following sections describe various additional non-limiting examples and examples of systems and methods for systems and methods for deformation and haptic effects.

Figure 1B:
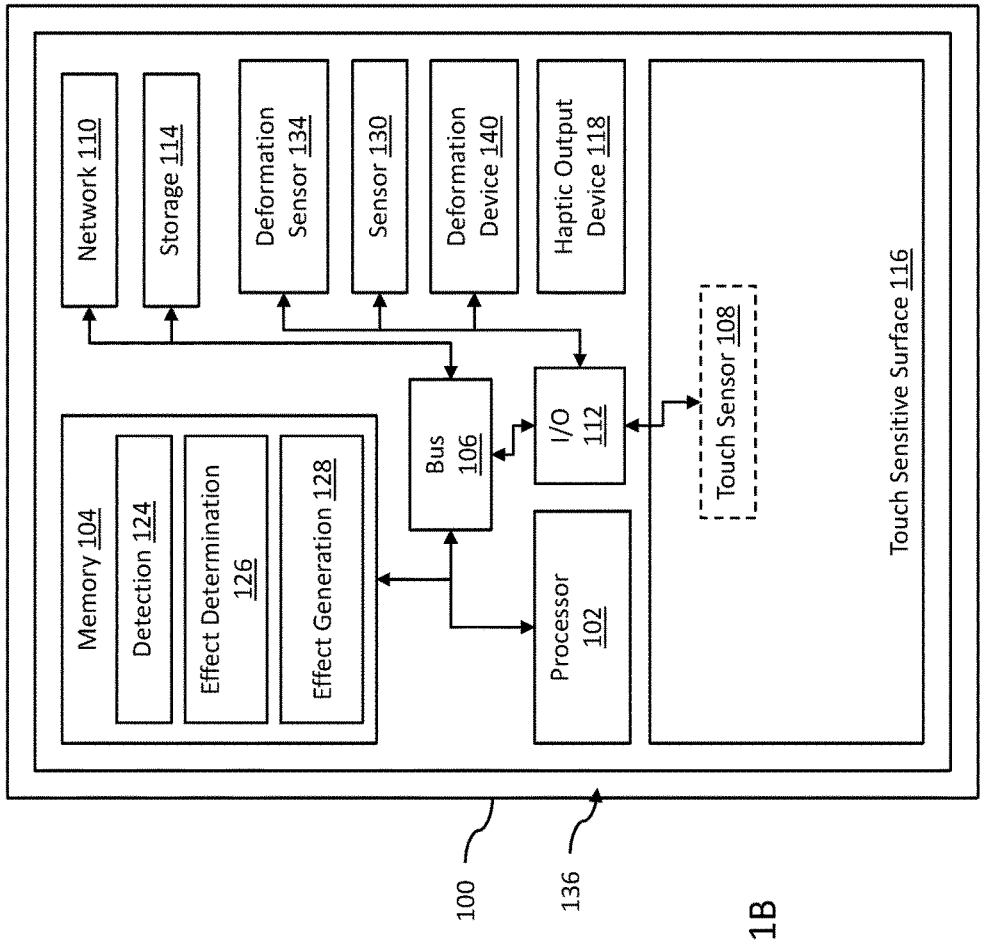
Figure 2:
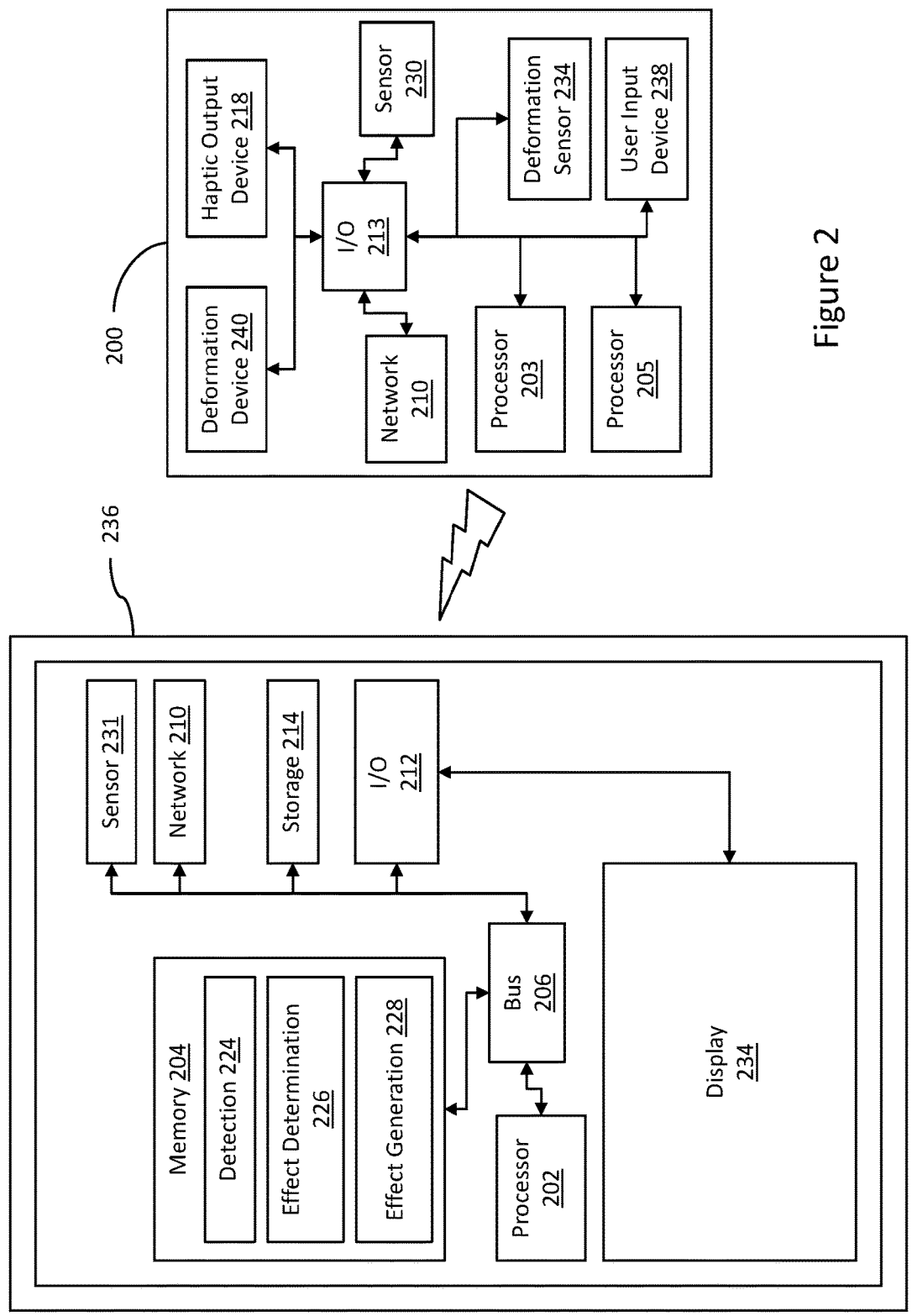

FIGS. 1A and 1B show an example computing device 100 for deformation and haptic effects. The computing device 100 may comprise, for example, a mobile phone, tablet, e-reader, laptop computer, portable gaming device, medical device, stereo, remote control, or gaming controller. In other examples, the computing device 100 may comprise a multifunction controller, for example, a controller for use in a kiosk, automobile, alarm system, thermostat, or other type of electronic device. In some examples, the computing device 100 may include wearable computing devices, such as wristwatches, bracelets, necklaces, belts, virtual reality (VR) headsets, headphones, gloves, or boots. While computing device 100 is shown as a single device in FIGS. 1A-1B, in other examples, the computing device 100 may comprise multiple devices, for example, as shown in FIG. 2.

The example computing device 100 is flexible, foldable, bendable, twistable, squeezable, stretchable, rollable, and/or otherwise deformable. For example, in some examples, the computing device 100 may comprise two or more rigid components coupled by one or more hinges. The computing device 100 may deform (e.g., fold) by pivoting the two or more rigid components about the one or more hinges. In other examples, the computing device 100 may comprise one or more bumpers 136. The bumpers 136 may be coupled to the sides of the computing device 100. For example, bumpers 136 may be coupled to the top, bottom, left, and right of the computing device 100, respectively. In the example shown in FIG. 1B, a single bumper 136 is positioned around the entire circumference of the computing device 100. The bumper 136 may be moveable, squeezable, stretchable, or otherwise deformable. In some examples, a user may interact with the bumper(s) 136 to provide input to the computing device 100. Further, in some examples, the bumper may comprise, or be, a haptic output device configured to output haptic effects, such as deformation effects or vibration haptic effects, in response to one or more haptic effect signals. Thus, in some examples, the bumper may operate both as an input device and as a haptic output device.

The example computing device 100 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 100. In some examples, the computing device 100 may further comprise one or more network interface devices 110, input/output (I/O) interface components 112, and additional storage 114.

Network interface device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate a connection to devices such as one or more displays, keyboards, mice, speakers, microphones, buttons, joysticks, and/or other hardware used to input data or output data. Additional storage 114 represents nonvolatile storage such as read-only memory, flash memory, ferroelectric RAM (F-RAM), magnetic, optical, or other storage media included in the computing device 100 or coupled to processor 102.

The computing device 100 includes a touch-sensitive surface 116. In the example shown in FIG. 1B, the touch-sensitive surface 116 is integrated into computing device 100. In other examples, the computing device 100 may not comprise the touch-sensitive surface 116. Touch-sensitive surface 116 represents any surface that is configured to sense tactile input of a user. In some examples, the touch-sensitive surface 116 may be rollable, bendable, foldable, stretchable, twistable, squeezable, or otherwise deformable. For example, the touch-sensitive surface 116 may comprise a bendable electronic paper or a bendable touch-sensitive display device.

One or more touch sensors 108 are configured to detect a touch in a touch area in some examples when an object contacts a touch-sensitive surface 116 and provide appropriate data for use by processor 102. Any suitable number, type, or arrangement of sensors can be used. For example, resistive and/or capacitive sensors may be embedded in touch-sensitive surface 116 and used to determine the location of a touch and other information, such as pressure, speed, and/or direction. As another example, optical sensors with a view of the touch-sensitive surface 116 may be used to determine the touch position.

In other examples, the touch sensor 108 may comprise a LED (Light Emitting Diode) detector. For example, in some examples, touch-sensitive surface 116 may comprise a LED finger detector mounted on the side of a display. In some examples, the processor 102 is in communication with a single touch sensor 108. In other examples, the processor 102 is in communication with a plurality of touch sensors 108, for example, touch sensors associated with a first touch-screen and a second touch screen. The touch sensor 108 is configured to detect user interaction, and based on the user interaction, transmit signals to processor 102. In some examples, touch sensor 108 may be configured to detect multiple aspects of the user interaction. For example, touch sensor 108 may detect the speed and pressure of a user interaction, and incorporate this information into the signal.

In some examples, computing device 100 may include a touch-enabled display that combines a touch-sensitive surface 116 and a display. The touch-sensitive surface 116 may correspond to the display exterior or one or more layers of material above components of the display. In other examples, touch-sensitive surface 116 may not comprise (or otherwise correspond to) a display, depending on the particular configuration of the computing device 100.

The computing device 100 also comprises a deformation sensor 134. The deformation sensor 134 is configured to detect deformations (e.g., bending, flexing, stretching, folding, twisting, squeezing, or rolling) of a surface. For example, the deformation sensor 134 may be configured to detect deformations in the computing device 100, the bumper(s) 136, and/or touch-sensitive surface 116. In some examples, the deformation sensor 134 may comprise a pressure sensor, strain gauge, a force sensor, a range sensor, a depth sensor, a 3D imaging system (e.g., the 3D imagining system commonly sold under the trademark Microsoft Kinect®), and/or a LED-based tracking system (e.g., external to the computing device 100). In other examples, the deformation sensor 134 may comprise a smart gel, fluid, and/or piezoelectric device. The smart gel, fluid, and/or piezoelectric device may generate a voltage based on the deformation. For example, a layer of smart gel may be coupled to the surface. The smart gel may generate an amount of voltage associated with an amount of deformation (e.g., bending) in the surface.

The deformation sensor 134 is configured to transmit a sensor signal (e.g., a voltage) to the processor 102. Although the example shown in FIG. 1B depicts the deformation sensor 134 internal to computing device 100, in some examples, the deformation sensor 134 may be external to computing device 100 (e.g., as shown in FIG. 2). For example, in some examples, the one or more deformation sensors 134 may be associated with a game controller for use with a computing device 100 comprising a game system.

The computing device 100 also comprises one or more additional sensor(s) 130. The sensor(s) 130 are configured to transmit sensor signals to the processor 102. In some examples, the sensor(s) 130 may comprise, for example, a camera, humidity sensor, ambient light sensor, gyroscope, GPS unit, accelerometer, range sensor or depth sensor, biorhythm sensor, or temperature sensor. Although the example shown in FIG. 1B depicts the sensor 130 internal to computing device 100, in some examples, the sensor 130 may be external to computing device 100. For example, in some examples, the one or more sensors 130 may be associated with a game controller for use with a computing device 100 comprising a game system. In some examples, the processor 102 may be in communication with a single sensor 130 and, in other examples, the processor 102 may be in communication with a plurality of sensors 130, for example, a temperature sensor and a humidity sensor. In some examples, the sensor 130 may be remote from computing device 100, but communicatively coupled to processor 102, for example, as shown in FIG. 2.

Computing device 100 further includes haptic output device 118 in communication with the processor 102. The haptic output device 118 is configured to output a haptic effect in response to a haptic signal. In some examples, the haptic output device 118 is configured to output a haptic effect comprising, for example, a vibration, a change in a perceived coefficient of friction, a simulated texture, a change in temperature, a stroking sensation, an electro-tactile effect, or a surface deformation (e.g., a deformation of a surface associated with the computing device 100). Although a single haptic output device 118 is shown here, some examples may comprise multiple haptic output devices 118 of the same or different type that can be actuated in series or in concert to produce haptic effects.

In the example shown in FIG. 1B, the haptic output device 118 is internal to computing device 100. In other examples, the haptic output device 118 may be remote from computing device 100, but communicatively coupled to processor 102, for example, as shown in FIG. 2. For instance, haptic output device 118 may be external to and in communication with computing device 100 via wired interfaces such as Ethernet, USB, IEEE 1394, and/or wireless interfaces such as IEEE 802.11, Bluetooth, or radio interfaces.

In some examples, the haptic output device 118 may be configured to output a haptic effect comprising a vibration. In some such examples, the haptic output device 118 may comprise one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some examples, the haptic output device 118 may be configured to output a haptic effect modulating the perceived coefficient of friction on along a surface of the computing device 100 in response to a haptic signal. In some such examples, the haptic output device 118 may comprise an ultrasonic actuator. The ultrasonic actuator may comprise a piezo-electric material. An ultrasonic actuator may vibrate at an ultrasonic frequency, for example 20 kHz, increasing or reducing the perceived coefficient at the surface of touch-sensitive surface 116.

In some examples, the haptic output device 118 may use electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 100 (e.g., touch-sensitive surface 116). In some examples, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some examples, a high-voltage amplifier may generate the AC signal. The electric signal may generate a capacitive coupling between the conducting layer and an object (e.g., a user's finger or a stylus) near or touching the haptic output device 118. In some examples, varying the levels of attraction between the object and the conducting layer can vary the haptic effect perceived by a user.

In some examples, the computing device 100 may comprise a deformation device 140 configured to output a deformation haptic effect. In some such examples, the deformation haptic effect may be configured to raise or lower portions of a surface associated with the computing device (e.g., the touch-sensitive surface 116). In other examples, the deformation haptic effect may comprise bending, folding, warping, rolling, twisting, squeezing, flexing, changing the shape of, or otherwise deforming the computing device 100 or a surface associated with the computing device 100 (e.g., the touch-sensitive surface 116). For example, the deformation haptic effect may apply a force on the computing device 100 (or a surface associated with the computing device 100), causing it to bend, fold, roll, twist, squeeze, flex, change shape, or otherwise deform. Further, in some examples, the deformation haptic effect may comprise preventing or resisting the computing device 100 or a surface associated with the computing device 100 from bending, folding, rolling, twisting, squeezing, flexing, changing shape, or otherwise deforming.

In some examples, the deformation device 140 may comprise a mechanical deformation device. For example, the deformation device 140 may comprise an actuator coupled to an arm that rotates a deformation component. The deformation component may comprise, for example, an oval, starburst, or corrugated shape. The deformation component may be configured to move a surface associated with the computing device 100 at some rotation angles but not others. In some examples, the deformation device 140 may comprise a piezo-electric actuator, rotating/linear actuator, solenoid, an electroactive polymer actuator, macro fiber composite (MFC) actuator, shape memory alloy (SMA) actuator, and/or other actuator. In some examples, as the deformation device 140 rotates the deformation component, the deformation component may move the surface, causing it to deform. In some such examples, the deformation component may begin in a position in which the surface is flat. In response to receiving a signal from processor 102, the actuator may rotate the deformation component. Rotating the deformation component may cause one or more portions of the surface to raise or lower. The deformation component may, in some examples, remain in this rotated state until the processor 102 signals the actuator to rotate the deformation component back to its original position. In some examples, however, the deformation device may actuate a deformation component by applying an electrical signal or a thermal signal to the component. Further, in some examples, the deformation device 140 may include multiple deformation components, which may be configured to assist or oppose each other. For example, an example computing device may include a deformation device 140 with two opposable MFC components, one configured to deform the computing device 100 in one direction and the other configured to deform the computing device 100 in the other direction.

Other techniques or methods can be used to deform a surface associated with the computing device 100. For example, the deformation device 140 may comprise a flexible surface layer configured to deform its surface or vary its texture based upon contact from a surface reconfigurable haptic substrate (e.g., fibers, nanotubes, electroactive polymers, piezoelectric elements, or shape memory alloys). In some examples, the deformation device 140 may be deformed, for example, with a deforming mechanism (e.g., a motor coupled to wires), air or fluid pockets, local deformation of materials, resonant mechanical elements, piezoelectric materials, micro-electromechanical systems ("MEMS") elements or pumps, thermal fluid pockets, variable porosity membranes, or laminar flow modulation.

In some examples, the deformation device 140 may be a portion of (or coupled to) the housing of the computing device 100. In other examples, the deformation device 140 may be disposed within a flexible layer overlaying a surface associated with the computing device 100 (e.g., the front or back of the computing device 100). For example, the deformation device 140 may comprise a layer of smart gel or rheological fluid positioned over a hinge in the computing device 100 (e.g., where the hinge is configured to allow the computing device 100 to fold or bend). Upon actuating the deformation device 140 (e.g., with an electric current or an electric field), the smart gel or rheological fluid may change its characteristics. This may cause the computing device 100 to fold, bend, or flex, or prevent (e.g., resist against) the computing device 100 from folding, bending, or flexing.

In some examples, the deformation device 140 may comprise fluid configured for outputting a haptic effect (e.g., configured to deform a surface associated with the computing device 100 or apply a force to a user input device). For example, in some examples, the fluid may comprise a smart gel. The smart gel may comprise mechanical or structural properties that change in response to a stimulus or stimuli (e.g., an electric field, a magnetic field, temperature, ultraviolet light, shaking, or a pH variation). For instance, in response to a stimulus, the smart gel may change in stiffness, volume, transparency, and/or color. In some examples, the stiffness may resist against, or assist the user in, deforming a surface associated with the computing device 100 or interacting with a user input device. For example, a smart gel layer may be positioned around a shaft of a joystick or within a button. In response to a stimulus, the smart gel may become rigid, which may prevent a user from operating the joystick or pressing the button. In some examples, one or more wires may be embedded in or coupled to the smart gel. As current runs through the wires, heat is emitted, causing the smart gel to expand, contract, or change rigidity. This may deform a surface associated with the computing device 100 or apply a force to the user input device.

As another example, in some examples, the fluid may comprise a rheological (e.g., a magneto-rheological or electro-rheological) fluid. A rheological fluid may comprise metal particles (e.g., iron particles) suspended in a fluid (e.g., oil or water). In response to an electric or magnetic field, the order of the molecules in the fluid may realign, changing the overall damping and/or viscosity of the fluid. This may cause a surface associated with the computing device 100 to deform or cause a force to be applied a user input device.

The computing device 100 also includes memory 104. Memory 104 comprises program components 124, 126, and 128, which are depicted to show how a device can be configured in some examples to provide deformation-based haptic effects. The detection module 124 configures the processor 102 to monitor the deformation sensor 134 to detect a deformation in a surface associated with the computing device 100. For example, detection module 124 may sample the deformation sensor 134 to track the presence or absence of a bend in the surface and, if a bend is present, to track one or more of the amount, velocity, acceleration, pressure and/or other characteristics of the bend over time.

The detection module 124 also configures the processor 102 to monitor the touch-sensitive surface 116 via touch sensor 108 to determine a position of a touch. For example, detection module 124 may sample the touch sensor 108 to track the presence or absence of a touch and, if a touch is present, to track one or more of the location, path, velocity, acceleration, pressure and/or other characteristics of the touch over time. Although the detection module 124 is depicted in FIG. 1B as a program component within the memory 104, in some examples, the detection module 124 may comprise hardware configured to monitor the deformation sensor 134 and/or the touch sensor 108. In some examples, such hardware may comprise analog to digital converters, processors, microcontrollers, comparators, amplifiers, transistors, and other analog or digital circuitry.

Effect determination module 126 represents a program component that analyzes data to determine a deformation or haptic effect to generate. The effect determination module 126 comprises code that determines one or more deformation or haptic effects to output. In some examples, the effect determination module 126 may comprise code that determines a deformation or haptic effect based on a signal from the deformation sensor 134. For example, deformations (e.g., bending the computing device 100 in varying amounts) may be mapped to functions (e.g., move to the next page in a virtual book, move several pages in the virtual book, or close the virtual book) associated with a user interface. Effect determination module 126 may select different haptic effects based on the function. In other examples, the effect determination module 126 may determine deformation or haptic effects based on a characteristic of the deformation (e.g., the amount of bend in the computing device 100).

Effect determination module 126 may also comprise code that determines, based on a signal from touch sensor 108 or another user interface device (e.g., a button, switch, joystick, wheel, or trigger), a deformation or haptic effect to output. For example, in some examples, some or all of the area of touch-sensitive surface 116 may be mapped to a graphical user interface. Effect determination module 126 may determine different deformation or haptic effects based on the location of a touch (e.g., to simulate the presence of a feature on the surface of touch-sensitive surface 116). In some examples, these features may correspond to a visible representation of the feature on the interface. However, haptic effects may be provided via touch-sensitive surface 116 or the display even if a corresponding element is not displayed in the interface (e.g., a haptic effect may be provided if a boundary in the interface is crossed, even if the boundary is not displayed).

In some examples, effect determination module 126 may comprise code that determines a deformation or haptic effect to output based on the amount of pressure a user (e.g., the user's finger) exerts against the touch-sensitive surface 116 and/or computing device 100. For example, in some examples, effect determination module 126 may determine different deformation or haptic effects based on the amount of pressure a user exerts against the surface of touch-sensitive surface 116. In some examples, the amount of pressure a user exerts on the touch-sensitive surface 116 may affect the strength of the haptic effect perceived by the user. For example, in some examples, reduced pressure may cause the user to perceive a weaker haptic effect. The effect determination module 126 may detect or determine this reduction in pressure and, in response, output or change a haptic effect to compensate for this change. For example, the effect determination module may determine a more intense haptic effect to compensate for the reduced pressure. Thus, the haptic effect perceived by the user may remain the same as before the reduction in pressure.

In some examples, the effect determination module 126 may determine a deformation or haptic effect based at least in part a characteristic (e.g., a virtual size, width, length, color, texture, material, trajectory, type, movement, pattern, or location) associated with a virtual object. For example, the effect determination module 126 may determine a haptic effect comprising a series of short, pulsed vibrations if a texture associated with the virtual object is coarse. As another example, the effect determination module 126 may determine a haptic effect comprising a change in temperature if a color associated with the virtual object is red. As still another example, the effect determination module 126 may determine a haptic effect configured to increase a perceived coefficient of friction if the virtual object comprises a texture that is rubbery.

In some examples, the effect determination module 126 may comprise code that determines a deformation or haptic effect based at least in part on signals from sensor 130 (e.g., a temperature, an amount of ambient light, an accelerometer measurement, or a gyroscope measurement). For example, the effect determination module 126 may determine a deformation or haptic effect based on a gyroscopic measurement (e.g., the relative position of the computing device 100 in real space). In some such examples, if the computing device 100 is tilted at a particular angle, the computing device 100 may output one or more corresponding deformation or haptic effects (e.g., a vibration).

Although the effect determination module 126 is depicted in FIG. 1B as a program component within the memory 104, in some examples, the effect determination module 126 may comprise hardware configured to determine one or more deformation or haptic effects to generate. In some examples, such hardware may comprise analog to digital converters, processors, microcontrollers, comparators, amplifiers, transistors, and other analog or digital circuitry.

Effect generation module 128 represents programming that causes processor 102 to generate and transmit signals to the deformation device 140 or haptic output device 118 to generate the determined deformation or haptic effect. For example, the effect generation module 128 may access stored waveforms or commands to send to the haptic output device 118 to create the desired effect. In some examples, the effect generation module 128 may comprise algorithms to determine the haptic signal. Further, in some examples, effect generation module 128 may comprise algorithms to determine target coordinates for the haptic effect (e.g., coordinates for a location on the touch-sensitive surface 116 at which to output a haptic effect).

Although the effect generation module 128 is depicted in FIG. 1B as a program component within the memory 104, in some examples, the effect generation module 128 may comprise hardware configured to determine one or more deformation or haptic effects to generate. In some examples, such hardware may comprise analog to digital converters, processors, microcontrollers, comparators, amplifiers, transistors, and other analog or digital circuitry.

FIG. 2 is a block diagram showing a system for deformation-based haptic effects according to another embodiment. The system 200 comprises a computing system 236. In some embodiments, computing system 236 may comprise, for example, a game console, laptop computer, desktop computer, set-top box (e.g., DVD player, DVR, cable television box), or another computing system.

The computing system 236 comprises a processor 202 in communication with other hardware via bus 206. The computing system 236 also comprises a memory 204, which comprises a haptic effect detection module 224, effect determination module 226, and effect generation module 228. These components may be configured to function similarly to the memory 104, detection module 124, effect determination module 126, and effect generation module 128 depicted in FIG. 1B, respectively.

The computing system 236 also comprises network interface device 210, I/O components 212, additional storage 214, and sensors 231. These components may be configured to function similarly to the network interface device 110, I/O components 112, additional storage 114, and sensors 130 depicted in FIG. 1B, respectively.

The computing system 236 further comprises a display 234. In some embodiments, the display 234 may comprise a separate component, e.g., a remote monitor, television, or projector coupled to processor 202 via a wired or wireless connection.

The computing system 236 is communicatively coupled to a computing device 200. The computing device 200 is flexible, foldable, bendable, twistable, squeezable, stretchable, rollable, and/or otherwise deformable. In some embodiments, the computing device 200 may comprise, for example, a game controller, remote control, a wearable device, or a mobile device.

The computing device 200 may comprise a processor 203, memory 205, haptic effect detection module 224 (not shown), effect determination module 226 (not shown), and effect generation module 228 (not shown). The computing device 200 may also comprise a network interface device 210. In this example, the computing device 200 comprises the network interface device 210 and is in communication with computing system 236 via a wireless interface, such as IEEE 802.11, Bluetooth, or radio interfaces (e.g., transceiver/antenna for accessing a CDMA, GSM, UMTS, or other mobile communications network).

The computing device 200 comprises I/O components 213, which may be configured to function in similar ways as the I/O 112 components depicted in FIG. 1B. The computing device 200 also comprises a user input device 238 in communication with the I/O components 213. The user input device 238 comprises a device for allowing user interaction with the computing device 200. For example, the user input device 238 may comprise a joystick, directional pad, button, switch, speaker, microphone, touch-sensitive surface, and/or other hardware used to input data.

The computing device 200 further comprises one or more sensors 230, deformation sensors 234, deformation devices 240, and haptic output devices 218. These components may be configured to function similarly to the sensors 130, deformation sensors 134, deformation devices 140, and haptic output devices 118 depicted in FIG. 1B, respectively.

Figure 3:
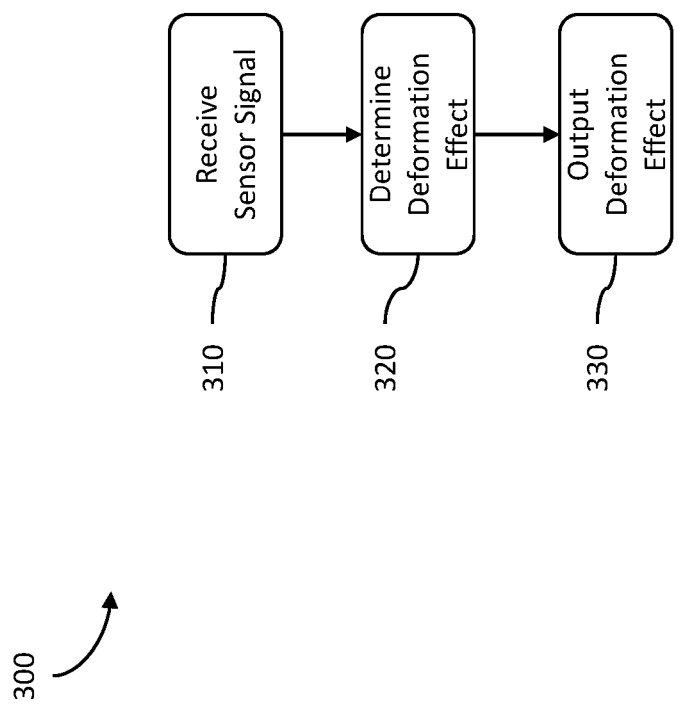
FIG. 3 shows an example method for deformation and haptic effects.

Referring now to FIG. 3, FIG. 3 illustrates an example method for deformation and haptic effects. Reference will be made to the computing device 100 of FIGS. 1A-1B, however, methods according to this disclosure are not limited to use with the computing device 100 of FIGS. 1A-1B. Rather, any suitable computing device, such as the example computing device 200 shown in the example system of FIG. 2, may be employed. The method 300 of FIG. 3 begins at block 310, and for purposes of this example, the computing device 100 is a smartphone.

At block 310, the processor 102 receives a sensor signal from a sensor, the sensor signal indicating a contact with a device and a location of the contact on the device. For example, the processor 102 can receive a sensor signal from the sensor 130. In this example, the sensor 130 includes a contact sensor configured to detect a contact with the device by an object. Suitable contact sensors may include any suitable sensors, such as those discussed above with respect to FIGS. 1B and 2, including capacitive or resistive sensors or one or more image sensors. In some examples, the sensor(s) 130 may provide only an indication of contact (or of multiple different contacts), e.g., a binary signal or a coordinate indicating the location of the contact. However, in some other examples, the sensor(s) 130 may provide alternative or additional information, such as pressure, pseudo-pressure, an area or size of a contact, or image information.

In this example, the processor 102 receives the sensor signal and determines that a contact has occurred with the device. In some examples, a contact sensor may provide a binary indication of a contact with the device, however, in some examples, a contact sensor may indicate a pressure or pseudo-pressure associated with a contact. For example, the sensor 130 may provide a value indicating a pressure of a contact, such as a force in newtons or a pseudo-pressure value between minimum and maximum pseudo-pressure values.

In addition, the sensor signal indicates a location of the contact. In some examples, the sensor 130 may provide information identifying a location of a contact, such as coordinates identifying a location. In some examples, the processor 102 may access a data structure in memory 104 that indicates locations on the smartphone 100 and one or more sensors 130 corresponding to the respective locations. In response to receiving a signal from one or more sensors 130, the processor 102 may access the data structure and identify a location corresponding to the one or more sensors 130 from which the signal(s) was/were received. Thus, in one example, the sensor signal may identify the transmitting sensor, which the processor 102 may use to identify a corresponding location on the smartphone 100. In some examples, a sensor 130 may provide information regarding multiple contacts, such as in the case of a multi-touch In some examples, the sensor signal may include location information, such as a coordinate or coordinates of one or more contacts, and the processor may further access information, e.g., stored in a data structure in memory 104, to determine a location on the smartphone corresponding to the received sensor signal(s).

In some examples, the sensor 130 includes a pressure sensor and the smartphone 100 includes several such sensors 130, some of which are configured to detect pressures on a front surface of the smartphone 100 and some are configured to detect pressures on a rear surface of the smartphone 100. In this example, a user has placed the smartphone 100 in her pocket. After doing so, the sensors 130 detect various levels of pressures depending on which portions of the smartphone 100 correspond to the respective sensors 130. For example, sensors 130 measuring pressures on the rear face of the smartphone 100 may detect increased pressures, while sensors 130 measuring pressures on the front face of the smartphone 100 may detect increased pressures near the center portion of the front face, but reduced or no pressure on the outer edges of the front face. Such sensor readings may indicate that the smartphone has been placed in the user's pocket with the front face against the user's leg, while the rear face experiences pressures exerted by the fabric of the user's pants. Further, in some examples, the sensors 130 may make up an array of sensors that can detect one or more contacts, including an area of a contact or a pressure applied to an area of contact, and provide one or more sensor signals that indicate an area or size of a contact or the pressure applied to an area of a contact. Thus, the processor 102 can receive a number of different sensor signals from the various sensors 130.

In some examples, a suitable computing device may be in communication with another computing device; for example, a user may use both a smartphone and a wearable device that are in communication with each other. For example, the system of FIG. 2 may have a smartphone 236 and a wearable device 200. The processor 202 in the smartphone 236 may receive one or more sensor signals from the wearable device 200. Or in some examples, the wearable device 206 may receive one or more sensor signals from the smartphone 236.

At block 320, the processor 102 determines a deformation effect based on the contact and the location of the contact, the deformation effect configured to cause a change in a shape of a housing of the device. In this example, the smartphone 100, when idle (e.g., locked), attempts to equalize contact across the smartphone 100. For example, if the smartphone 100 detects contacts along the top ⅓ of the rear face of the smartphone 100 and the bottom ⅓ of the rear face of the smartphone 100, but no contacts in the middle third of the rear face of the smartphone 100, the processor determines that, based on all sensed contacts occurring on the rear face of the smartphone 100, that the smartphone should deform to extend the middle rear face of the smartphone 100 and create a convex shape with rear face of the smartphone 100. Thus, one approach comprises determining a face of a computing device associated with the sensed contacts, determining a direction for a deformation based on the sensed contacts, wherein the direction is in the direction of the inferred object(s) contacting the face of the computing device, and deforming a portion of the device without sensed contacts in the direction.

Figure 4B:
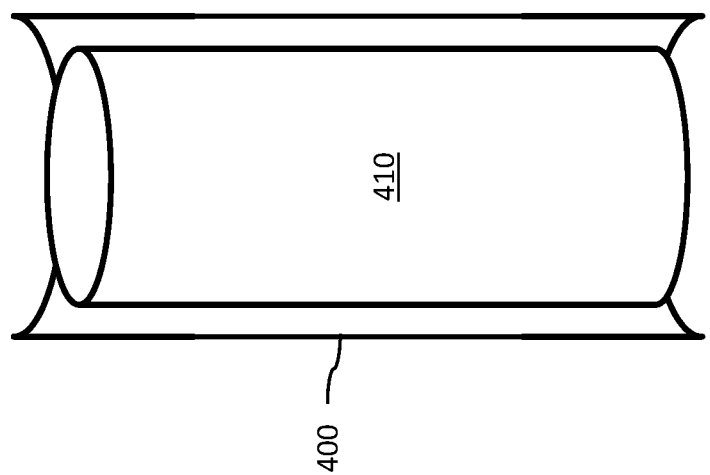
FIGS. 4A-4B shows an example conforming deformation of a computing device.
Figure 4A:
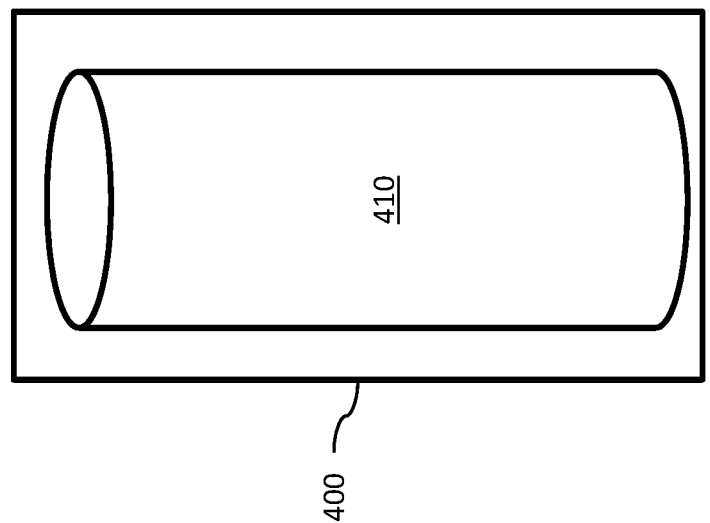

For example, referring to FIG. 4A, FIG. 4A shows an example computing device 400 according to this specification and an object 410. The computing device 400 is brought into contact with the object 410 and detects contacts along a vertical line in approximately the center of front fact of the device 400. Based on the sensed contacts on the front face of the device 400, the device 400 determines a direction for a deformation of the device 400 in a direction of the contacts based on the presence of an object inferred by the device 400. As can be seen in FIG. 4B, the device 400 has deformed in the direction of the inferred object, creating a concave shape and apparently wrapping itself around the object 410.

As discussed above, in some examples, one or more sensors 130 may provide information such as pressure or pseudo-pressure. In some such examples, the smartphone 100 may attempt to equalize pressures (or pseudo-pressures) applied to the smartphone, such as by deforming to reduce a sensed pressure, e.g., by deforming away from the sensed pressure, or by deforming to cause other portions of the smartphone 100 towards the sensed pressure to increase the pressure on those portions of the smartphone 100.

In another example, the processor 102 employs the sensor information to determine a deformation effect by first determining whether the smartphone 100 is located in a user's pocket or other holding position, e.g., it has been inserted into a VR headset, or whether a user is actively using the smartphone, e.g., the user is holding the smartphone 100 in her hand. The processor 102 may determine the smartphone's usage context from the received sensor information. For example, the processor 102 may determine that the user is holding and using the smartphone 100 based on sensed contact with the edge of the smartphone 100 and an image of the user's face captured by a front-facing camera incorporated into the smartphone. In some examples, the processor 102 may determine that the smartphone is in a user's pocket based on multiple points of contact on the front and back of the smartphone 100, or that the smartphone 100 has been inserted into a VR headset based on, for example, Bluetooth communications received from the VR headset. The processor 102 may also access image information from a front-facing (or a rear-facing) camera and determine that the image information indicates a mostly, or all, black image. The processor 102 may determine other usage contexts, such as whether the device has been left on a table or other flat surface.

After determining the usage context in this example, the processor 102 determines a deformation effect. In some examples, the processor 102 may determine that no deformation effect should be output. For example, if the user is actively using the smartphone 100, e.g., the smartphone 100 is unlocked and is being held by the user, the processor 102 may determine that no deformation effect should be output. In some examples, however, the processor 102 may instead determine a deformation effect configured to curve the smartphone towards the user, such as to provide a more direct angle of incidence to the user's eye. Such a deformation effect may be determined based on contacts with the edges of the device and one or more images of the user's face captured by a front-facing camera.

In some examples, the processor 102 may determine that the smartphone 100 is in a usage state where it should conform to an object or objects in contact with the smartphone 100, and thus, based on the determination to conform the shape of the smartphone 100, the processor 102 determines a deformation effect to conform the shape of the smartphone 100 to the object or objects. For example, the user may hold the device in one hand. Thus, the device may deform itself by flexing into a concave shape to better fit the palm of the user's hand. In another example, referring again to FIG. 4, the computing device 400, after detecting the contact with the object 410, determines a deformation effect to equalize contact with the object 410, resulting in the device 400 wrapping around the object. In some examples, the device may be placed in a bag, such as a purse, luggage, or a backpack, and into a space that does not fully accommodate the device, e.g., the space is too small, there are lots of loose objects, or is between flexible objects, such as magazines or paperback books. After the device is placed in the bag, it may determine pressures applied to various portions of the device by nearby objects or voids within the bag. It may then determine one or deformations based on the detected pressures. For example, the device may determine whether one or more pressures exceeds a predefined pressure threshold. Such a pressure threshold may be defined to prevent damage to the device or it may be a minimum pressure threshold below which conformance deformation effects are not output. The device may then determine deformations that cause portions of the device experiencing high pressures to deform away from the pressure to attempt to alleviate the pressure and to better conform to an available space. Thus, if placed between two books that may flex or bend, the device may also deform to try to conform to the books as they change shape.

To conform to a shape of an object, the smartphone 100 may first determine the existence of one or more objects. For example, the smartphone 100 may determine the existence of a user's hand based on sensed contact with the edges of the smartphone 100, or the smartphone may determine the existence of a user's leg and pants pocket based on sensed contacts with the device and a usage context. To make such a determination in this example, the smartphone 100 accesses a data structure in memory 104 having a plurality of templates corresponding to different types of commonly-encountered objects, such as a hand, a pocket, or a tabletop. Each template includes information characterizing approximate contact profiles for each such object. For example, a template may comprise a plurality of contacts on one edge of a device and one contact on the opposite edge of the device. Such a template may represent multiple fingertips contacting one side of a device and a thumb contacting the other side of the device. Such a template may be specific to right- and left-handed holds of the smartphone, or may be applied generically in either instance.

In some examples, a template may provide a deformation that enables a device to grab another object or to support the device. For example, a template may comprise a hook or loop shape to enable the device to attach itself to, for example, a selfie-stick, a handlebar, or a rollcage. In some examples, the template may cause the device to deform to bend and create a flat surface to allow the device to stand upright on a table, desk, or other flat surface.

Figure 5:
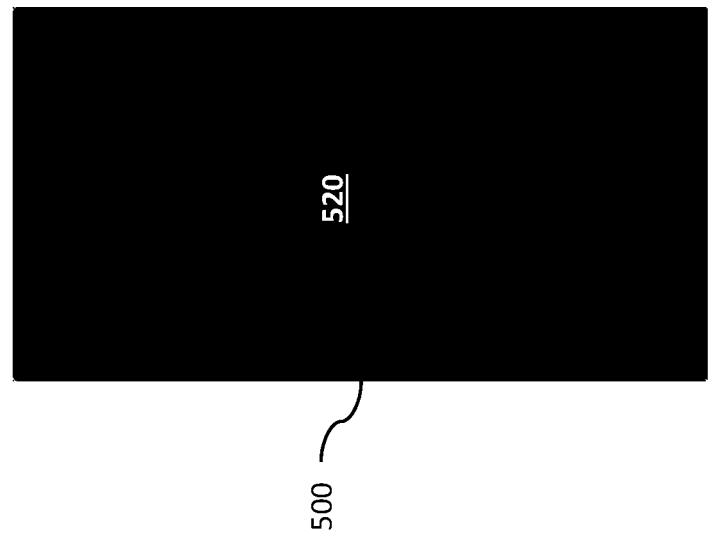
FIG. 5 shows an example contact template for deformation and haptic effects.
Figure 5:
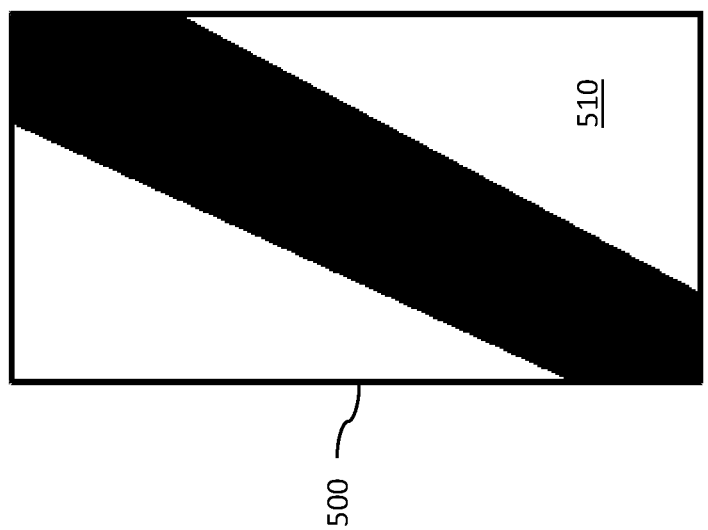

Referring now to FIG. 5, FIG. 5 shows another example template corresponding to a computing device 500 associated with the device being in a user's pants pocket. The computing device 500 has a first face 510 and a second face 520, where the darkened portions of each face represent detected contacts (or pressures, etc.) with the respective face of the device. Thus, when the processor 102 receives sensor signals indicating contacts substantially matching the template, and the device 500 is in an idle usage context, the processor 102 determines that the device 500 is located in the user's pocket. For example, the first face 510 indicates contact along a single region of the face, which may correspond to contact with the user's leg, while the second face 520 indicates contact over the entire second face 520, which may correspond to contact with the user's pant material. And while the template shown in FIG. 5 is shown with a diagonal contact on the first face 510 of the device 500, the template may be defined such that the orientation of the contact is immaterial, but rather the general characteristics of the contact region controls. In some examples, machine learning techniques may be used to define or refine templates.

It should be noted that while the template in FIG. 5 are shown graphically, an actual template accessed by the processor 102 may instead comprise other data formats to characterize the contact or pressure patterns or templates, such as defined regions or region shapes, orientations, locations, sizes, etc. Further, and as discussed above, generic templates may be provided, but may be refined over time based on actual usage characteristics or detected contacts, pressures, etc.

In some examples, to determine a deformation effect, the smartphone 100 accesses a pre-determined deformation effect. For example, the smartphone 100 may access a data structure stored in memory 104 having a pre-defined deformation effects associated with different usage contexts or detected contacts, pressures, etc. For example, a pre-determined deformation effect may be provided for use when the processor 102 detects the smartphone 100 is located in a user's pocket. In one such example, the pre-determined deformation effect may be created based on a typical leg shape and orientation of a device within a user's pocket, or it may be created based on an amount of curvature determined to be suitable for handheld grasping of the smartphone 100. In some examples, the smartphone 100 may refine one or more of the pre-defined deformation effects over time based on usage by a particular user, such as described above, based on actual sensed contacts following deformation according to a pre-defined deformation effect. For example, after deforming according to a pre-defined deformation effect for handheld grasping, the smartphone 100 may not detect any contact with the rear face of the device, but only with the edges of the device. The processor 102 may determine that additional deformation should be applied until the rear face of the smartphone 100 contacts the palm of the user's hand, or until a maximum amount of deformation is reached.

Further, in examples where the computing device includes multiple computing devices in communication with each other, such as may be seen in the example shown in FIG. 2, either computing device 200, 236 may perform such determinations, or may each do so simultaneously.

After determining a deformation effect, the method 300 proceeds to block 330.

At block 330, the processor 102 outputs the deformation effect to a deformation device configured to change the shape of the housing of the device. In different examples, the smartphone 100 or other suitable computing device comprises one or more deformation devices configured to deform the smartphone 100, such as by changing a shape of the housing of the smartphone. For example, the smartphone may comprise one or more SMA devices incorporated into the housing such that changes in voltage, current, temperature, etc. cause the SMA devices to change shapes. Thus the processor 102 accesses information stored in memory 104 based on the determined deformation effect and outputs one or more signals to the deformation device(s) to cause the deformation device(s) to change shape, thereby changing the shape of the housing of the device. And as discussed above, in examples having multiple computing devices in communication with each other, the respective processor may output a deformation effect to a deformation device within the same computing device, or may output a signal to another of the computing devices. For example, computing device 236 may determine a deformation effect and the output the deformation effect to the processor 203 in the other computing device 200, which then outputs the deformation effect to the deformation device 240.

After outputting the deformation effect, the method 300 returns to block 320, where the smartphone may determine another deformation effect, or may further refine a previously-output deformation effect.

Figure 6:
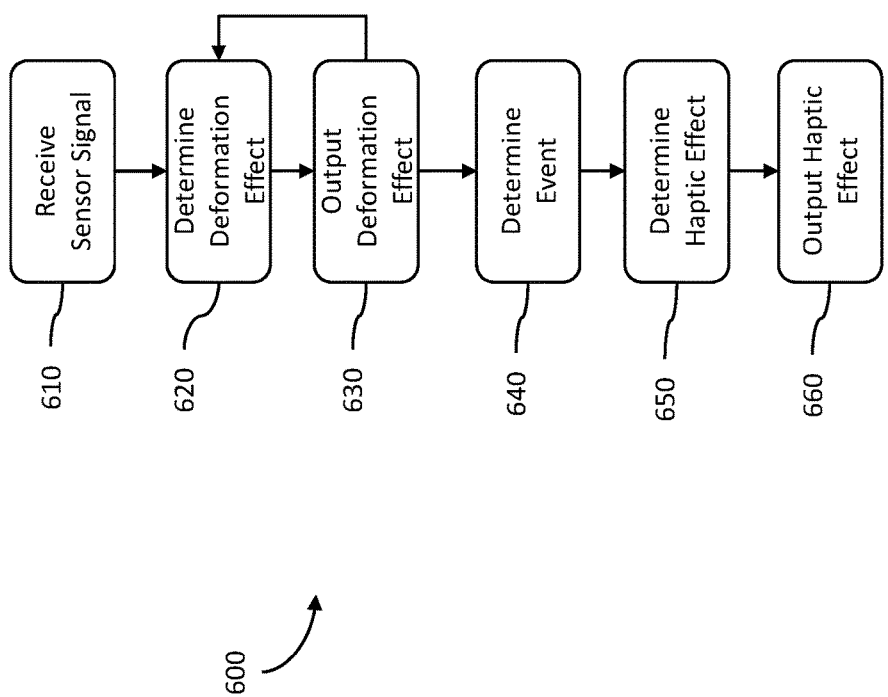
FIG. 6 shows an example method for deformation and haptic effects.

Referring now to FIG. 6, FIG. 6 shows an example method 600 for deformation and haptic effects. Reference will be made to the computing device 100 of FIGS. 1A-1B, however, methods according to this disclosure are not limited to use with the computing device 100 of FIGS. 1A-1B. Rather, any suitable computing device, such as the example computing device 200 shown in the example system of FIG. 2, may be employed. The method 600 of FIG. 6 begins at block 610, and for purposes of this example, the computing device 100 is a smartphone.

At block 610, the processor 102 receives a sensor signal from a sensor, the sensor signal indicating a contact with a device and a location of the contact on the device as discussed above with respect to block 310 of the method 300 of FIG. 3.

At block 620, the processor 102 determines a deformation effect based on the contact and the location of the contact, the deformation effect configured to cause a change in a shape of a housing of the device as discussed above with respect to block 320 of the method 300 of FIG. 3.

At block 630, the processor 102 outputs the deformation effect to a deformation device configured to change the shape of the housing of the device as discussed above with respect to block 330.

At block 640, the processor 102 determines an event. In various examples, the event can be any detectable or other event. For example, an event may be the receipt of a text or other message, a received phone call, a received voice mail, a received email, an alarm, a calendar reminder, a video call (e.g., FaceTime®, Skype®, or Google Hangout®), over-temperature warning, low battery warning, or navigation event (e.g., upcoming turn or approaching destination). Still other types of events are contemplated and within the scope of this disclosure.

At block 650, the processor 102 determines a haptic effect based on the event, the haptic effect comprising a second deformation effect to anti-conform the shape of the housing to the shape of the object. For example, as discussed above, a smart phone may assume a curved shape to conform to the shape of a user's leg. An anti-conforming shape includes a shape that has deformations in the opposite shape as the conforming shape. Thus, if the rest state for a smartphone comprises a flat planar shape, and a conformance deformation includes a curving of the housing in one direction, an anti-conformance deformation includes a curving of the housing in the opposite direction. A degree of conformance or anti-conformance may relate to a magnitude of a deformation.

For example, a conformance deformation that causes a smartphone to curve into an arc shape having a first amount of curvature, e.g., the arc shape is based on radius of curvature of 6 meters, a higher magnitude anti-conformance deformation may have a second amount of curvature in the opposite direction, e.g., an arc shape based on a radius of curvature of 3 meters and centered at a location on the opposite side of the smartphone. Such an anti-conforming shape may provide immediate, noticeable haptic feedback to a user about an event. For example, a smartphone that has assumed a shape that conforms to a user's leg may be unnoticed by the user due to the lack of an awkward shape, but a transition to a shape opposing the conforming shape should draw the attention of the user to the now-awkwardly-shaped device, which may then return to the conforming shape after a predetermined period of time, or may return to a rest state shape when it detects the user grasping the device. In some examples, the device may deform to maximize a pressure against a user's body. For example, the device may deform itself away from a centerline of the device to press against adjacent objects, e.g., clothing material, to cause the centerline of the device to press against the user.

Figure 7A:
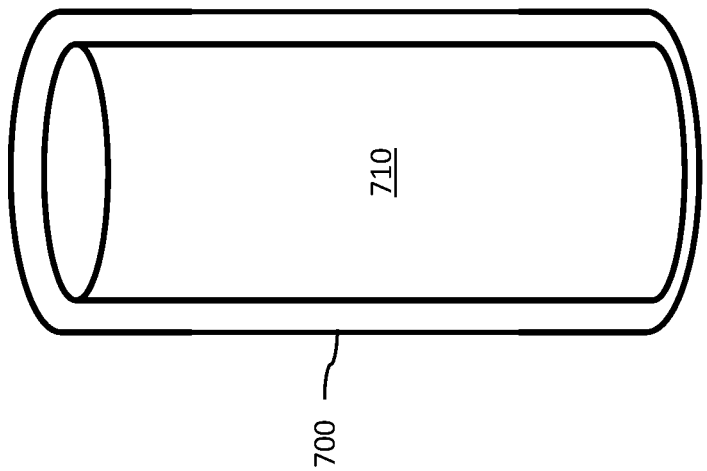
FIGS. 7A-7B shows an example anti-conforming deformation of a computing device.
Figure 7B:
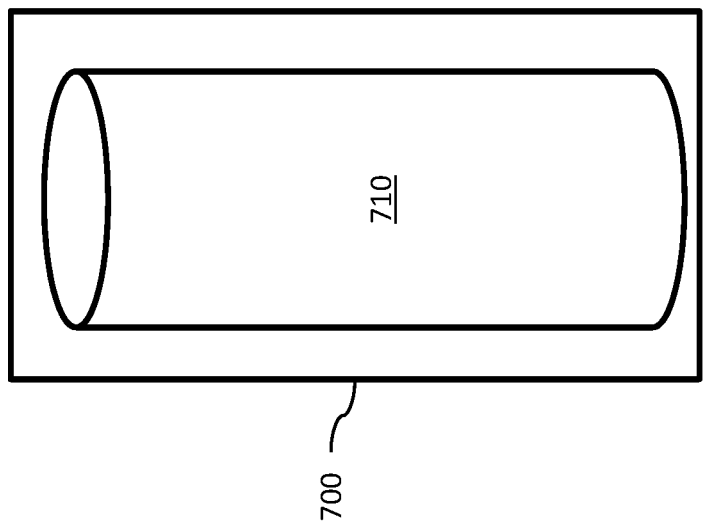

Referring now to FIGS. 7A-7B, FIG. 7A shows a computing device 700 in contact with an object 710. In FIG. 7B, the computing device has output an anti-confirming deformation by deforming a direction opposite of the conforming deformation shown in FIG. 4B by assuming a convex shape rather than a concave shape.

In some examples, in addition to an anti-conforming deformation, the haptic effect may include other types of haptic effects based on available haptic output devices. For example, an anti-conforming deformation effect may be determined as well as a vibration effect.

At block 660, the processor 102 outputs the haptic effect to the deformation device as discussed above with respect to block 330 of the method 300 of FIG. 3. In addition, in examples where the processor 102 also generates other types of haptic effects, such as vibration effects, the processor 102 outputs such haptic effects to the appropriate haptic output device 118.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

That which is claimed is:

1. A method comprising:
receiving one or more sensor signals from at least one sensor, the one or more sensor signals indicating contacts with a mobile computing device, pressures of the respective contacts, and locations of the respective contacts on the mobile computing device;
determining a deformation effect based on the contacts and the locations of the contacts, the deformation effect configured to cause a change in a shape of the mobile computing device to equalize sensed pressures on the mobile computing device; and
outputting the deformation effect to a deformation device configured to change the shape of the mobile computing device.

2. The method of claim 1, further comprising determining an input to the mobile computing device based on the at least one sensor, and wherein the deformation effect is further based on the input.

3. The method of claim 2, wherein the input comprises a deformation of the mobile computing device.

4. The method of claim 1, further comprising receiving a second sensor signal from a second sensor, and wherein the deformation effect is further based on the second sensor signal.

5. The method of claim 1, further comprising determining a correspondence to a shape of a portion of an object based on the contact and the location of the contact, and wherein the deformation effect is further based on the correspondence to the shape of the portion of the object.

6. The method of claim 5, wherein determining the deformation effect is further based on a determination to conform the shape of a housing of the mobile computing device to the shape of the object.

7. The method of claim 5, further comprising:
determining an event;
determining a haptic effect based on the event, the haptic effect comprising a second deformation effect to anti-conform the shape of a housing of the mobile computing device to the shape of the object; and
outputting the haptic effect to the deformation device.

8. The method of claim 1, wherein the deformation effect is further configured to equalize contacts on the mobile computing device.

9. A mobile computing device comprising:
at least one sensor;
a deformable housing;
a deformation device in communication with the deformable housing and configured to change a shape of at least a portion of the deformable housing;
a non-transitory computer-readable medium comprising processor-executable program code; and
a processor in communication with the sensor, the deformation device, and the non-transitory computer-readable medium, the processor configured to execute the processor-executable program code stored in the non-transitory computer-readable medium, the processor-executable program code configured to cause the processor to:
receive one or more sensor signals from at least one sensor, the one or more sensor signals indicating contacts with the mobile computing device, pressures of the respective contacts, and locations of the respective contacts on the mobile computing device;
determine a deformation effect based on the contact and the location of the contact, the deformation effect configured to cause a change in a shape of the deformable housing of the mobile computing device to equalize sensed pressures on the mobile computing device; and
output the deformation effect to the deformation device.

10. The mobile computing device of claim 9, further comprising determining an input to the mobile computing device based on the one or more sensor signals, and wherein the deformation effect is further based on the input.

11. The mobile computing device of claim 10, wherein the input comprises a deformation of the mobile computing device.

12. The mobile computing device of claim 9, further comprising receiving a second sensor signal from a second sensor, and wherein the deformation effect is further based on the second sensor signal.

13. The mobile computing device of claim 9, further comprising determining a correspondence to a shape of a portion of an object based on the contact and the location of the contact, and wherein the deformation effect is further based on the correspondence to the shape of the portion of the object.

14. The mobile computing device of claim 13, wherein determining the deformation effect is further based on a determination to conform the shape of the deformable housing to the shape of the object.

15. The mobile computing device of claim 13, further comprising:
determining an event;
determining a haptic effect based on the event, the haptic effect comprising a second deformation effect to anti-conform the shape of the deformable housing to the shape of the object; and
outputting the haptic effect.

16. The device of claim 9, wherein the deformation effect is further configured to equalize contacts on the mobile computing device.

17. A non-transitory computer-readable medium comprising processor-executable program code configured to cause a processor to:
receive one or more sensor signals from at least one sensor, the one or more sensor signals indicating contacts with a mobile computing device, pressures of the respective contacts, and locations of the respective contacts on the mobile computing device;
determine a deformation effect based on the contact and the location of the contact, the deformation effect configured to cause a change in a shape of the mobile computing device to equalize sensed pressures on the mobile computing device; and
output the deformation effect to a deformation device configured to change the shape of the mobile computing device.

18. The non-transitory computer-readable medium of claim 17, wherein the deformation effect is further configured to equalize contacts on the mobile computing device.

* * * * *